(12) United States Patent
Jung et al.

(10) Patent No.: US 12,541,815 B2
(45) Date of Patent: Feb. 3, 2026

(54) METHOD AND DEVICE FOR OUTPUTTING PATHOLOGY SLIDE IMAGE

(71) Applicant: LUNIT INC., Seoul (KR)

(72) Inventors: Won Kyung Jung, Seoul (KR); Soo Ick Cho, Seoul (KR)

(73) Assignee: Lunit Inc., Seoul (KR)

( * ) Notice: Subject to any disclaimer, the term of this patent is extended or adjusted under 35 U.S.C. 154(b) by 172 days.

(21) Appl. No.: 18/087,382

(22) Filed: Dec. 22, 2022

(65) Prior Publication Data

US 2023/0206388 A1    Jun. 29, 2023

(30) Foreign Application Priority Data

Dec. 24, 2021   (KR) .................. 10-2021-0187098
Mar. 4, 2022    (KR) .................. 10-2022-0028108

(51) Int. Cl.
*G06T 3/40*     (2024.01)
*G06T 11/60*    (2006.01)

(52) U.S. Cl.
CPC ............ *G06T 3/40* (2013.01); *G06T 11/60* (2013.01)

(58) Field of Classification Search
CPC .................................. G06T 3/40; G06T 11/60
USPC .................... 345/604, 660, 589; 348/79, 80
See application file for complete search history.

(56) References Cited

U.S. PATENT DOCUMENTS

| | | | |
|---|---|---|---|
| 11,587,667 B2 * | 2/2023 | Ferreira | G06F 3/04845 |
| 2012/0069049 A1 | 3/2012 | Howe et al. | |
| 2012/0320094 A1 * | 12/2012 | Ruddle | G16H 30/20 |
| | | | 345/660 |
| 2013/0265322 A1 * | 10/2013 | Tsujimoto | G06T 11/001 |
| | | | 345/589 |
| 2013/0271593 A1 * | 10/2013 | Tsujimoto | G02B 21/36 |
| | | | 345/589 |
| 2014/0036058 A1 * | 2/2014 | Takahashi | G06T 3/4038 |
| | | | 348/80 |
| 2017/0322146 A1 * | 11/2017 | Murayama | G01N 21/27 |
| 2017/0372471 A1 | 12/2017 | Euren | |
| 2018/0055408 A1 * | 3/2018 | Song | A61B 5/201 |
| 2019/0115660 A1 * | 4/2019 | Inukai | H01Q 3/44 |
| 2019/0236780 A1 | 8/2019 | Barnes et al. | |
| 2020/0234441 A1 | 7/2020 | Prabhudesai et al. | |
| 2020/0294231 A1 * | 9/2020 | Tosun | G06V 20/69 |
| 2021/0042968 A1 * | 2/2021 | Kuromi | G06T 7/70 |
| 2021/0166381 A1 * | 6/2021 | Yip | G06T 11/00 |
| 2021/0224541 A1 * | 7/2021 | Stumpe | G06T 7/0012 |

(Continued)

FOREIGN PATENT DOCUMENTS

KR    10-2021-0136884 A    11/2021

OTHER PUBLICATIONS

International Search Report dated Mar. 24, 2023, issued in International Application No. PCT/KR2022/020223.

(Continued)

*Primary Examiner* — Prabodh M Dharia
(74) *Attorney, Agent, or Firm* — Sughrue Mion, PLLC

(57) ABSTRACT

A method of outputting a pathology slide image includes receiving a user input related to a method of outputting at least one region included in the pathology slide image, based on the user input, determining an area of a guide to be output on the pathology slide image and a region of the pathology slide image included in the guide, and based on the determined area and region, outputting the pathology slide image on which the guide is overlaid.

17 Claims, 15 Drawing Sheets

(56) References Cited

U.S. PATENT DOCUMENTS

| | | | | |
|---|---|---|---|---|
| 2022/0138939 | A1* | 5/2022 | Jalali | G16H 10/40 |
| | | | | 348/79 |
| 2022/0351379 | A1* | 11/2022 | Lorsakul | G06T 7/0012 |
| 2023/0154491 | A1* | 5/2023 | Sawada | G11B 5/676 |
| | | | | 360/134 |
| 2024/0079116 | A1* | 3/2024 | Miri | G16H 30/40 |
| 2024/0153088 | A1* | 5/2024 | Danjo | G06T 7/0014 |

OTHER PUBLICATIONS

"ImageScope User's Guide, Revision P", Leica Biosystems Imaging, Inc., Sep. 23, 2015, 119 pages (including front and back "covers").

* cited by examiner

FIG. 7A
FIG. 7B
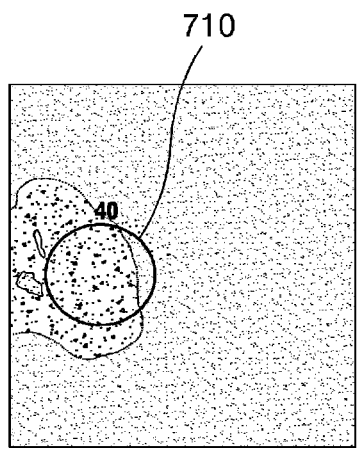
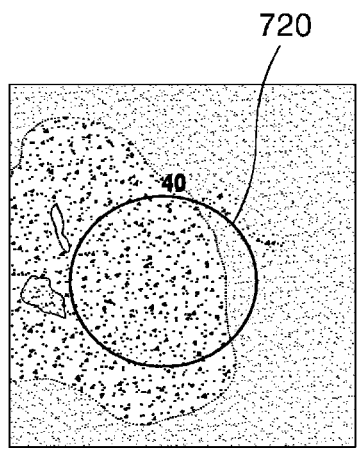

METHOD AND DEVICE FOR OUTPUTTING PATHOLOGY SLIDE IMAGE

CROSS-REFERENCE TO RELATED APPLICATIONS

This application is based on and claims priority under 35 U.S.C. § 119 to Korean Patent Applications No. 10-2021-0187098, filed on Dec. 24, 2021, and No. 10-2022-0028108, filed on Mar. 4, 2022, in the Korean Intellectual Property Office, the disclosure of which is incorporated by reference herein in its entirety.

BACKGROUND

1. Field

The present disclosure relates to a method and device for outputting a pathology slide image.

2. Description of the Related Art

Digital pathology is a field for obtaining histological information of a patient or predicting a prognosis by using a whole slide image generated by scanning a pathology slide image.

In conventional pathology, pathologists mount a glass slide on an optical microscope, adjust the magnification and focus of the microscope, and examine the slide image while moving the glass slide up and down or left and right. On the other hand, in digital pathology, pathologists output a pathology slide image converted into an image file on a monitor screen, adjust the magnification by using a mouse or a keyboard, and examine the slide image while moving the slide.

Accordingly, there is an increasing demand for a technique for solving side effects that may occur due to the difference between an image examination method in conventional pathology and an image examination method in digital pathology.

SUMMARY

Provided are a method and device for outputting a pathology slide image. Provided is a computer-readable recording medium having recorded thereon a program for cause a computer to execute the method. The technical objectives to be solved are not limited to those described above, and other technical objects may be inferred from the following embodiments.

Additional aspects will be set forth in part in the description which follows and, in part, will be apparent from the description, or may be learned by practice of the presented embodiments of the present disclosure.

According to an aspect of an embodiment, a method of outputting a pathology slide image includes receiving a user input related to a method of outputting at least one region included in the pathology slide image, based on the user input, determining an area of a guide to be output on the pathology slide image and a region of the pathology slide image included in the guide, and based on the determined area and region, outputting the pathology slide image on which the guide is overlaid.

According to an aspect of another embodiment, a computer-readable recording medium includes a recording medium having recorded thereon a program for causing a computer to execute the method described above.

According to an aspect of another embodiment, a computing device includes at least one memory, and at least one processor, wherein the at least one processor is configured to determine, based on a user input related to a method of outputting at least one region included in a pathology slide image, an area of a guide to be output on the pathology slide image and a region of the pathology slide image included in the guide, and control a display device to output the pathology slide image on which the guide is overlaid, based on the determined area and region.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7A and FIG. 7B are diagrams for describing another example in which a pathology slide image on which a guide is overlaid is output, according to an embodiment;

DETAILED DESCRIPTION

Figure 1:
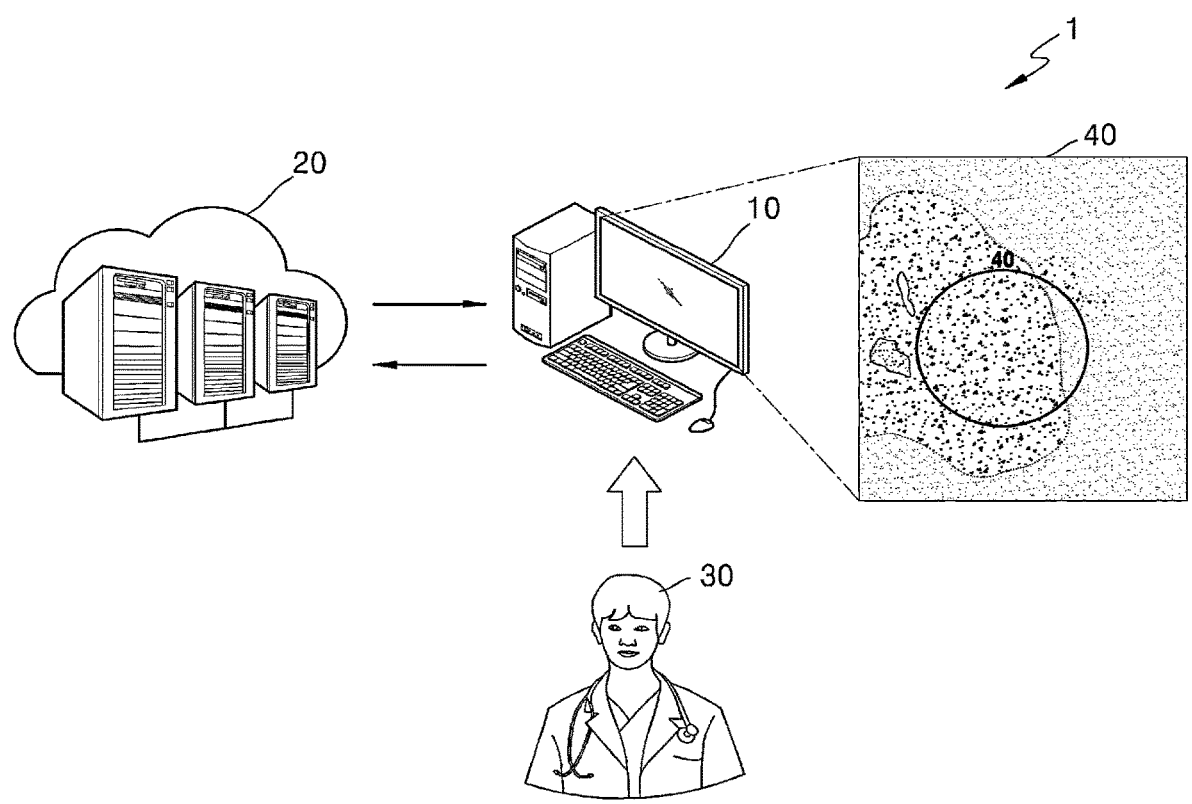
FIG. 1 is a diagram for describing an example of a system for outputting a pathology slide image according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items.

Although the terms used in the embodiments are selected from among common terms that are currently widely used, the terms may be different according to an intention of one of ordinary skill in the art, a precedent, or the advent of new technology. Also, in particular cases, the terms are discretionally selected by the applicant of the present disclosure, in which case, the meaning of those terms will be provided in detail in the corresponding description. Therefore, the terms used herein are not merely designations of the terms, but the terms are defined based on the meaning of the terms and content throughout the present specification.

Throughout the present specification, when a part "includes" a component, it means that the part may additionally include other components rather than excluding other components as long as there is no particular opposing recitation. Also, the terms described in the present specification, such as "... er (or)", "... unit", "... module", etc., denote a unit that performs at least one function or operation, which may be implemented as hardware or software or a combination thereof.

In addition, although the terms such as "first" or "second" may be used herein to describe various elements, these elements should not be limited by these terms. These terms may be only used to distinguish one element from another element.

Hereinafter, embodiments are described in detail with reference to the accompanying drawings. The embodiments may, however, be embodied in many different forms and should not be construed as being limited to the embodiments set forth herein.

FIG. 1 is a diagram for describing an example of a system for outputting a pathology slide image according to an embodiment.

Referring to FIG. 1, a system 1 includes a user terminal 10 and a server 20. For example, the user terminal 10 and the server 20 may be connected to each other in a wired or wireless communication manner to transmit and receive data (e.g., image data) to and from each other.

Although FIG. 1 illustrates, for convenience of description, that the system 1 includes the user terminal 10 and the server 20, the present disclosure is not limited thereto. For example, an external devices (not shown) may be included in the system 1, and operations of the user terminal 10 and the server 20 to be described below may be performed by a single device (e.g., the user terminal 10 or the server 20).

The user terminal 10 may output a pathology slide image 40, and a user 30 may manipulate the user terminal 10 in various ways to observe the pathology slide image 40 from various points of view.

Here, the pathology slide image 40 may refer to an image obtained by scanning a pathology slide that is fixed and stained through a series of chemical treatments in order to observe a tissue removed from a human body with a microscope. For example, the pathology slide image 40 may refer to a whole slide image including a high-resolution image of a whole slide. As another example, the pathology slide image 40 may refer to a portion of such a high-resolution whole slide image.

In addition, the pathology slide image 40 may refer to a patch region divided into patch units from the whole slide image. For example, the patch may have a size of a certain area. Alternatively, the patch may refer to a region including each of objects included in the whole slide.

In addition, the pathology slide image 40 may refer to a digital image obtained by converting a pathology slide into an image file by using a digital scanner, and may include information about cells, tissues, and/or structures in a human body.

The user terminal 10 may store and output the pathology slide image 40, and receive a user input from the user 30 to overlay a guide on the pathology slide image 40. For example, the user terminal 10 may enlarge or reduce at least one region of the pathology slide image 40, and may identify a region observed by the user 30 from the pathology slide image 40. Also, the user terminal 10 may store the pathology slide image 40 that is updated by a manipulation by the user 30. In addition, the user 30 may record and store, in the user terminal 10, information about a finding from the pathology slide image 40.

The user terminal 10 may transmit and receive various pieces of data as well as the pathology slide image 40 to and from the server 20 and/or the external device (not shown) through communication therewith. In addition, the user terminal 10 may store the transmitted or received data therein, or may request the server 20 and/or the external device (not shown) to store the transmitted or received data.

The user terminal 10 may be a computing device provided with a display device and a device for receiving a user input (e.g., a keyboard or a mouse), and including a memory and a processor. For example, the user terminal 10 may be a notebook personal computer (PC), a desktop PC, a laptop computer, a tablet computer, a smart phone, or the like, but is not limited thereto.

The server 20 may be a device that communicates with the user terminal 10 and the external device (not shown). For example, the server 20 may be a device that stores various pieces of data including the pathology slide image 40. As another example, the server 20 may be a computing device including a memory and a processor, and having a computing capability. In a case in which the server 20 is a computing device, the server 20 may perform at least some of operations of the user terminal 10 to be described below with reference to FIGS. 1 to 14. For example, the server 20 may be a cloud server, but is not limited thereto.

The user 30 may be a person that observes the pathology slide image 40 output on the user terminal 10, manipulate the user terminal 10 outputting the pathology slide image 40, or records a finding from the pathology slide image 40. For example, the user 30 may be a pathologist, but is not limited thereto.

In the traditional pathology, pathologists examine an image by observing a circular image through a lens of an optical microscope while manipulating an objective lens and a drive adjustment knob by hand. On the contrary, in the digital pathology, the user 30 examines an image while observing the pathology slide image 40 output on a display device by using a computer and a mouse.

It is difficult for pathologists, who are accustomed to examining images with conventional optical microscopes, to adapt to a method of adjusting the magnification of a slide image or searching a region of interest (e.g., a region of lesion), due to the interface in the digital pathology. Accordingly, it may take a long time to examine the pathology slide image 40, or a result of the examining may be inaccurate.

For example, the histological grade of breast cancer is determined based on the number of mitoses of cancer cells identified in an area 10 times the range that may be observed in a high-power field (HPF) of an optical microscope.

However, because it is difficult to estimate, from the pathology slide image 40, the range of HPF seen on a microscope, it may not be easy for a pathologist to determine an accurate histological grade based on the pathology slide image 40.

The user terminal 10 according to an embodiment determines, based on a user input, the area of the guide to be output on the pathology slide image 40 and a region included in the guide (i.e., a region of the pathology slide image 40 to be included in the guide). Then, the user terminal 10 outputs a pathology slide image on which the guide is overlaid, according to a result of the determining. Accordingly, the user terminal 10 may output an image that may be examined in the same manner as in a method of examining an image by using an optical microscope. Accordingly, even the user 30, who is accustomed to examining an image with a conventional optical microscope, may easily perform image examination according to the digital pathology.

In addition, the user terminal 10 according to an embodiment may output a region of the pathology slide image 40 that has been observed by the user, and the other regions (i.e., unobserved regions), to be distinguished from each other. Accordingly, the user 30 may intuitively check whether there is an unobserved region in the pathology slide image 40.

In addition, the user terminal 10 according to an embodiment determines whether a region of interest is included in the regions of the pathology slide image 40 that have been observed by the user. Accordingly, the user 30 may intuitively check whether region of interests have been completely observed.

Hereinafter, a method, performed by the user terminal 10, of outputting a pathology slide image will be described in detail with reference to FIGS. 2A to 14.

For convenience of description, throughout the present specification, it is described that the user terminal 10 determines the area of the guide to be output on the pathology slide image 40 and the region included in the guide, and outputs the pathology slide image 40 on which the guide is overlaid, but the present disclosure is not limited thereto. For example, at least some of the operations performed by the user terminal 10 may be performed by the server 20.

In other words, at least some of the operations of the user terminal 10 described with reference to FIGS. 1 to 11 may be performed by the server 20. For example, the server 20 may determine the area of the guide to be output on the pathology slide image 40 and the region included in the guide, and transmit, to the user terminal 10, a result of the determining. In addition, the user terminal 10 may output the pathology slide image 40 on which the guide is overlaid according to information (e.g., information about the areas of the pathology slide image and the guide or information about the region included the guide) transmitted from the server 20. However, the operation of the server 20 is not limited to the above-described operation.

Figure 2A:
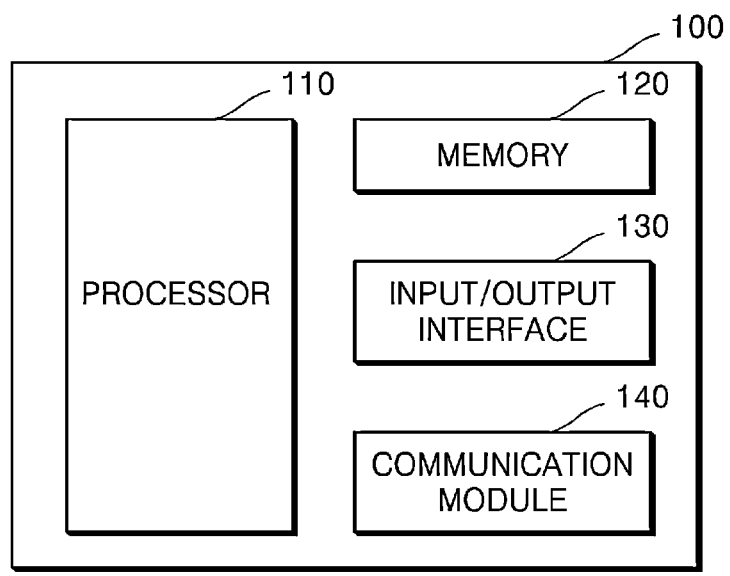
FIG. 2A is a configuration diagram illustrating an example of a user terminal according to an embodiment.

FIG. 2A is a configuration diagram illustrating an example of the user terminal 10 according to an embodiment.

Referring to FIG. 2A, a user terminal 100 includes a processor 110, a memory 120, an input/output interface 130, and a communication module 140. For convenience of description, FIG. 2A illustrates only components related to the present disclosure. Accordingly, other general-purpose components other than the components illustrated in FIG. 2A may be further included in the user terminal 100. In addition, it is apparent to those of skill in the art related to the present disclosure that the processor 110, the memory 120, the input/output interface 130, and the communication module 140 illustrated in FIG. 2A may be implemented as independent devices.

The processor 110 may process commands of a computer program by performing basic arithmetic, logic, and input/output operations. Here, the command may be provided from the memory 120 or an external device (e.g., the server 20). In addition, the processor 110 may control the overall operation of other components included in the user terminal 100.

In particular, the processor 110 may determine the area of the guide to be output on the pathology slide image, and the region of the pathology slide image included in the guide, based on a user input related to a method of outputting at least one region included in the pathology slide image. In addition, the processor 110 may control a display device to output the pathology slide image on which the guide is overlaid, based on the determined area and region.

In addition, the processor 110 may identify regions of the pathology slide image that have been observed by the user according to a certain reference, and control the display device to output the observed regions and the other regions to be distinguished from each other, according to a result of the identifying.

In addition, the processor 110 may set at least one region of interest in the pathology slide image, and identify regions in the pathology slide image that have been observed by the user according to a certain reference. Then, the processor 110 may determine whether the regions observed by the user include the region of interest. Then, when a user input related to termination of observation of the pathology slide image is received, the processor 110 may generate a notification signal for asking the user whether to additionally observe the pathology slide image based on a result of the determining.

The processor 110 may be implemented as an array of a plurality of logic gates, or may be implemented as a combination of a general-purpose microprocessor and a memory storing a program executable by the microprocessor. For example, the processor 110 may include a general-purpose processor, a central processing unit (CPU), a graphics processing unit (GPU), a microprocessor, a digital signal processor (DSP), a controller, a microcontroller, a state machine, and the like. In some environments, the processor 110 may include an application-specific integrated circuit (ASIC), a programmable logic device (PLD), a field-programmable gate array (FPGA), and the like. For example, processor 110 may also refer to a combination of processing devices, such as a combination of a DSP and a microprocessor, a combination of a plurality of microprocessors, a combination of one or more microprocessors in combination with a DSP core, or any other combination of such components.

Detailed examples in which the processor 110 according to an embodiment operates will be described with reference to FIGS. 3 to 14.

The memory 120 may include any non-transitory computer-readable recording medium. For example, the memory 120 may include a permanent mass storage device, such as random-access memory (RAM), read-only memory (ROM), a disk drive, a solid-state drive (SSD), or flash memory. As another example, the permanent mass storage device, such as ROM, an SSD, flash memory, or a disk drive, may be a permanent storage device separate from the memory. Also, the memory 120 may store an operating system (OS) and at least one piece of program code (e.g., code for the processor 110 to perform an operation to be described below with reference to FIGS. 3 to 14).

These software components may be loaded from a computer-readable recording medium separate from the memory 120. The separate computer-readable recording medium may be a recording medium that may be directly connected to the user terminal 100, and may include, for example, a computer-readable recording medium, such as a floppy drive, a disk, a tape, a digital video disc (DVD)/compact disc ROM (CD-ROM) drive, or a memory card. Alternatively, the software components may be loaded into the memory 120 through the communication module 140, instead of a computer-readable recording medium. For example, at least one program may be loaded to the memory 120 based on a computer program (e.g., a computer program for the processor 110 to perform an operation to be described below with reference to FIGS. 3 to 14) installed by files provided by developers or a file distribution system that provides an installation file of an application, through the communication module 140.

The input/output interface 130 may be a unit for an interface with a device (e.g., a keyboard or a mouse) for input or output that may be connected to the user terminal 100 or included in the user terminal 100. Although FIG. 2A illustrates that the input/output interface 130 is an element implemented separately from the processor 110, the present disclosure is not limited thereto, and the input/output interface 130 may be implemented to be included in the processor 110.

The communication module 140 may provide a configuration or function for the server 20 and the user terminal 100 to communicate with each other through a network. In addition, the communication module 140 may provide a configuration or function for the user terminal 100 to communicate with another external device. For example, a control signal, a command, data, and the like provided under control by the processor 110 may be transmitted to the server 20 and/or an external device through the communication module 140 and a network.

Meanwhile, although not illustrated in FIG. 2A, the user terminal 100 may further include a display device. Alternatively, the user terminal 100 may be connected to an independent display device in a wired or wireless communication manner to transmit and receive data to and from each other.

Figure 2B:
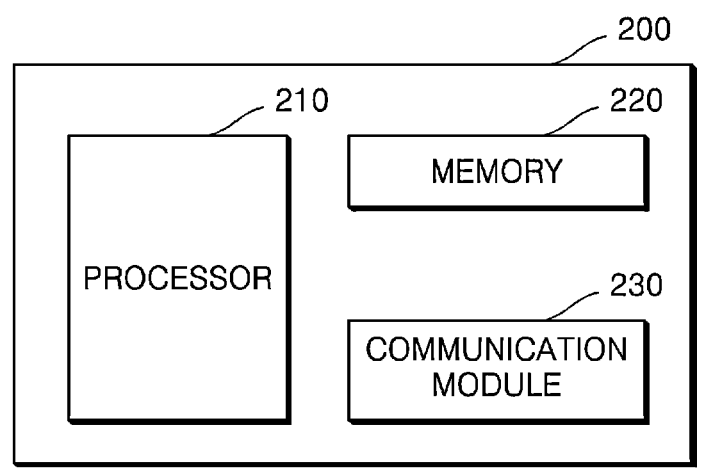
FIG. 2B is a configuration diagram illustrating an example of a server according to an embodiment.

FIG. 2B is a configuration diagram illustrating an example of a server according to an embodiment.

Referring to FIG. 2B, a server 200 includes a processor 210, a memory 220, and a communication module 230. For convenience of description, FIG. 2B illustrates only components related to the present disclosure. Accordingly, other general-purpose components other than the components illustrated in FIG. 2B may be further included in the server 200. In addition, it is apparent to those of skill in the art related to the present disclosure that the processor 210, the memory 220, and the communication module 230 illustrated in FIG. 2B may be implemented as independent devices.

The processor 210 may determine the area of a guide to be output on a pathology slide image and a region of the pathology slide image included in the guide, based on a user input related to a method of outputting at least one region included in the pathology slide image. In addition, the processor 210 may transmit, to the user terminal 10, relevant information such that the pathology slide image on which the guide is overlaid is output on the user terminal 10.

In addition, the processor 210 may identify, from the pathology slide image, regions that have been observed by the user according to a certain reference.

In addition, the processor 210 may set at least one region of interest in the pathology slide image, and identify regions in the pathology slide image that have been observed by the user according to a certain reference. Then, the processor 210 may determine whether the regions observed by the user include the region of interest. Then, when a user input related to termination of observation of the pathology slide image is received, the processor 210 may generate a notification signal for asking the user whether to additionally observe the pathology slide image based on a result of the determining.

In other words, the operation of the processor 110 described above with reference to FIG. 2A may be performed by the processor 210. In this case, the user terminal 10 may output, through a display device, information transmitted from the server 20.

Meanwhile, an example of an implementation of the processor 210 is the same as that of the processor 110 described above with reference to FIG. 2A, and thus, detailed descriptions thereof will be omitted.

Various pieces of data, such as a pathology slide image or data generated according to an operation of the processor 210, may be stored in the memory 220. Also, an OS and at least one program (e.g., a program required for the processor 210 to operate) may be stored in the memory 220.

Meanwhile, an example of an implementation of the memory 220 is the same as that of the memory 220 described above with reference to FIG. 2A, and thus, detailed descriptions thereof will be omitted.

The communication module 230 may provide a configuration or function for the server 200 and the user terminal 100 to communicate with each other through a network. In addition, the communication module 230 may provide a configuration or function for the server 200 to communicate with another external device. For example, a control signal, a command, data, and the like provided under control by the processor 210 may be transmitted to the user terminal 100 and/or an external device through the communication module 230 and a network.

Figure 3:
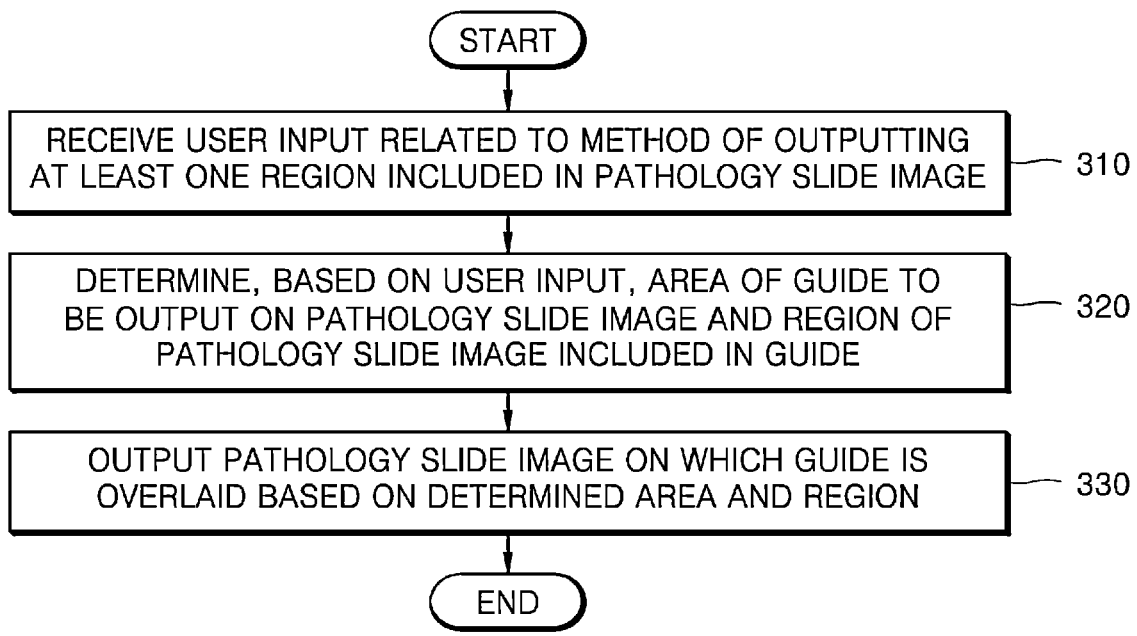
FIG. 3 is a flowchart illustrating an example of a method of outputting a pathology slide image according to an embodiment.

FIG. 3 is a flowchart illustrating an example of a method of outputting a pathology slide image according to an embodiment.

Referring to FIG. 3, the method of outputting a pathology slide image includes operations that are processed, in a time-series manner, by the user terminal 10 or 100 or the processor 110 illustrated in FIGS. 1 and 2A. Therefore, the descriptions provided above with respect to the user terminal 10 or 100 or the processor 110 illustrated in FIGS. 1 and 2A, which are even omitted below, may also be applied to the method of outputting a pathology slide image of FIG. 3.

In operation 310, the user terminal 10 or 100 receives a user input related to a method of outputting at least one region included in the pathology slide image.

For example, the pathology slide image 40 may be output on the display device of the user terminal 10 or 100, and then, the user terminal 10 or 100 may receive a user input. The user input may be received through a separate image output on the display device (e.g., an image configured to receive a user input), through a movement of a mouse wheel, or through an input of a keyboard shortcut preset by the user, but the present disclosure is not limited thereto.

The user input may be a manipulation on a region in the pathology slide image 40 that the user 30 desires to closely observe. For example, the user 30 may enlarge or reduce a partial region of the pathology slide image 40 through the user input.

In operation 320, the processor 110 determines, based on the user input, the area of a guide to be output on the pathology slide image 40 and a region of the pathology slide image 40 included in the guide.

For example, the processor 110 may increase or decrease the area of the guide in a state in which the region of the pathology slide image 40 included in the guide is fixed, based on a magnification specified according to the user input. As another example, the processor 110 may enlarge or reduce the region of the pathology slide image 40 included in the guide in a state in which the area of the guide is fixed, based on a magnification specified according to the user input.

Here, the guide may limit a region that the user 30 desires to closely observe. In a case in which image examination is performed by using an optical microscope according to a related-art technique, the user 30 observes the image through an eyepiece. Thus, the guide may have a shape that appears on the pathology slide image 40 to be the same as the region observed by the user 30 through the eyepiece.

Meanwhile, although not illustrated in FIG. 3, the processor 110 may calculate a scan magnification and a length per pixel of the pathology slide image 40. Accordingly, the processor 110 may calculate the area of the guide to be displayed on the pathology slide image 40 and the region of the pathology slide image 40 included in the guide, according to the user input.

In operation 330, the processor 110 outputs the pathology slide image on which the guide is overlaid based on the determined area and region. For example, the processor 110 may control the display device to output the pathology slide image on which the guide is overlaid.

The processor 110 may overlay the guide on the pathology slide image by modifying (e.g., enlarging or reducing) the pathology slide image 40 according to the area of the guide and the region of the pathology slide image 40 included in the guide, which are determined in operation 320.

Hereinafter, examples in which a pathology slide image on which a guide is overlaid is output will be described with reference to FIGS. 4 to 5.

Figure 4A:
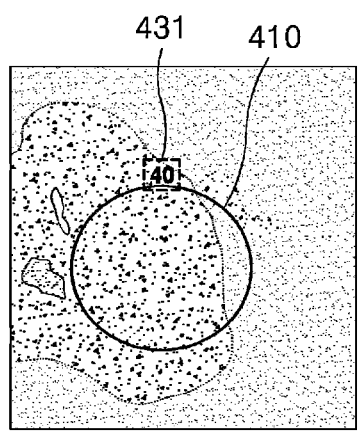
FIG. 4A and FIG. 4B are diagrams for describing an example in which a pathology slide image on which a guide is overlaid is output, according to an embodiment.
Figure 4B:
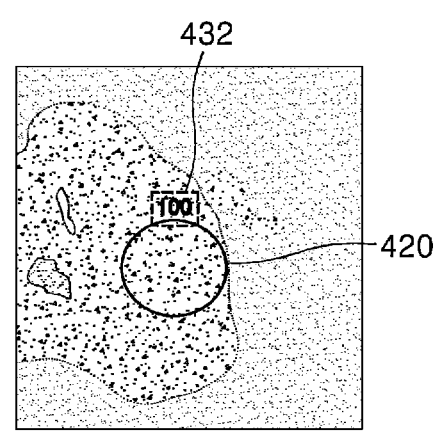

FIG. 4A and FIG. 4B are diagrams for describing an example in which a pathology slide image on which a guide is overlaid is output, according to an embodiment.

Referring to FIG. 4A, a guide 410 is overlaid on a pathology slide image. The guide 410 may be designated by the user 30 as a mark for distinguishing a region that the user 30 desired to closely observe, from the other regions. For example, the guide 410 may have a circular shape, but is not limited thereto.

There may be various examples of overlaying the guide 410 on the pathology slide image. For example, the guide 410 may be initially displayed at a preset position of the pathology slide image (e.g., the central position of the pathology slide image or the position of a region of interest), and then, the position of the guide 410 may be changed or fixed according to a manipulation by the user 30. As another example, the guide 410 may be initially displayed along a mark (e.g., a mouse cursor) on the pathology slide image, and then the position of the guide 410 may be fixed according to a manipulation by the user 30. However, examples of displaying the guide 410 on the pathology slide image are not limited to those described above, and any method that may help the user 30 observe the pathology slide image may be applied without limitation.

Meanwhile, a magnification 431 may be displayed in a region adjacent to the guide 410. Here, the term 'magnification' refers to an actual magnification that may be implemented with an optical microscope. Accordingly, through the guide 410 and the magnification 431 displayed on the pathology slide image, the user 30 may have a similar experience to observing an image by using an optical microscope.

In response to a user input received while the pathology slide image is output on the display device, the processor 110 output the guide overlaid on the pathology slide image. For example, when a user input for increasing or decreasing the magnification is received while the pathology slide image illustrated in FIG. 4A is output on the display device, the processor 110 determines the area of the guide and a region included in the guide, which correspond to the user input. Then, the processor 110 overlays the guide on the pathology slide image, based on the determined area of the guide and the determined region included in the guide.

For example, the processor 110 may increase or decrease the area of the guide in a state in which the region included in the guide is fixed, based on a magnification specified according to the user input.

In the example of FIG. 4A and FIG. 4B, it is assumed that the user input is for increasing the magnification to be between 40× magnification and 100× magnification. In this case, the processor 110 may determine that the area of the guide 410 is larger than the area of a guide 420 in a state in which the size of the pathology slide image output on the display device is fixed. That is, the size of the guide 420 corresponding to 100× magnification is smaller than the size of the guide 410 corresponding to 40× magnification. In other words, in a state in which the size of the pathology slide image output on the display device is fixed, the processor 110 adjusts the size of the guide 420 such that the actual area of a region observed with an optical microscope at 40× magnification (i.e., the area of the region of 410 of FIG. 4) and the actual area of a region observed with the optical microscope at 100× magnification (i.e., the area of the region of 420 of FIG. 4) are equal to each other.

The processor 110 overlays the guide 420 on the pathology slide image based on the area of the guide 420, and outputs the guide 420. Also, the processor 110 may display a magnification 432 corresponding to the user input, together with an output image (i.e., an image on which the guide 420 is overlaid). Here, the magnification 432 refers to an actual magnification of the optical microscope. That is, the magnification 432 refers to a magnification set in the optical microscope when the user 30 desires to observe a region in the guide 420 through the optical microscope.

Meanwhile, although not illustrated in FIG. 4A and FIG. 4B, an image for setting the magnification 431 or 432 may be output on the display device together with the pathology slide image or before the pathology slide image is output. For example, the user 30 may specify the magnification 431 or 432 through the image, and the processor 110 outputs the guide 410 or 420 on the pathology slide image in response to a user input for specifying the magnification. In addition, the image for setting the magnification 431 or 432 may be variously configured such that the user 30 may select a desired magnification.

Figure 5A:
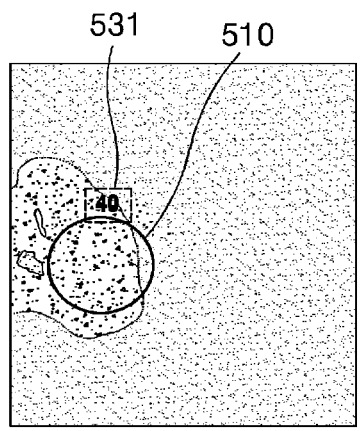
FIG. 5A and FIG. 5B are diagrams for describing another example in which a pathology slide image on which a guide is overlaid is output, according to an embodiment.
Figure 5B:
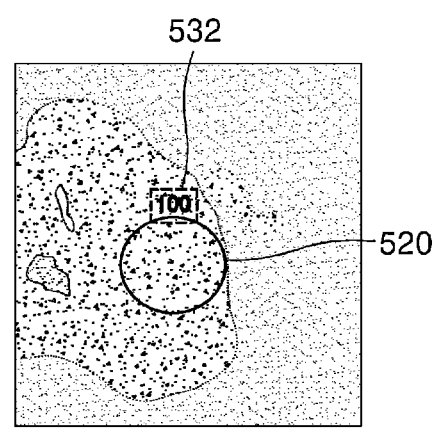

FIG. 5A and FIG. 5B are diagrams for describing another example in which a pathology slide image on which a guide is overlaid is output, according to an embodiment.

In the example of FIG. 5A and FIG. 5B, it is assumed that a user input is for increasing the magnification to be between 40× magnification and 100× magnification, as in the example of FIG. 4A and FIG. 4B.

When a user input for increasing or decreasing the magnification is received while the pathology slide image illustrated in FIG. 5A is output on the display device, the processor 110 determines the area of the guide and a region included in the guide, which correspond to the user input. Then, the processor 110 overlays the guide on the pathology slide image, based on the determined area of the guide and the determined region included in the guide, and outputs the guide.

For example, the processor 110 may enlarge or reduce the region included in the guide while the area of the guide is fixed, based on a magnification specified according to the user input.

When a user input for increasing the magnification from 40× magnification to 100× magnification is received, the processor 110 may determine that the actual area of the region included in a guide 510 is smaller than the actual area of the region included in a guide 520 in a state in which the on-screen areas of the guide 510 and the guide 520 are fixed to be the same value. That is, the actual area of the region included in the guide 520 corresponding to 100× magnification is smaller than the actual area of the region included in the guide 510 corresponding to 40× magnification. In other words, the processor 110 adjusts the actual area of the region included in the guide 520 such that the size of the guide corresponding to the optical microscope at 40× magnification (i.e., the on-screen area of the guide 510) and the size of the guide corresponding to the optical microscope at 100× magnification (i.e., the on-screen area of the guide 520) are equal to each other.

In addition, the processor 110 displays the magnification 531 or 532 in a region adjacent to the guide 510 or 520, such that the user 30 may intuitively recognize the magnification of the currently displayed guide. Here, the magnification 531 or 532 refers to an actual magnification of the optical microscope. That is, the magnification 531 or 532 refers to a magnification set in the optical microscope when the user 30 desires to observe a region in the guide 510 or 520 through the optical microscope.

Meanwhile, although not illustrated in FIG. 5A and FIG. 5B, an image for setting the magnification 531 or 532 may be output on the display device as described above with reference to FIG. 4A and FIG. 4B.

As described above with reference to FIGS. 3 to 5, even the user 30, who is accustomed to examining an image by using an existing optical microscope, may easily perform image examination according to the digital pathology.

Meanwhile, an example in which a user input for increasing the magnification is received is described above with reference to FIGS. 4 to 5. The same method may also be applied to a case in which a user input for decreasing the magnification is received.

Figure 6:
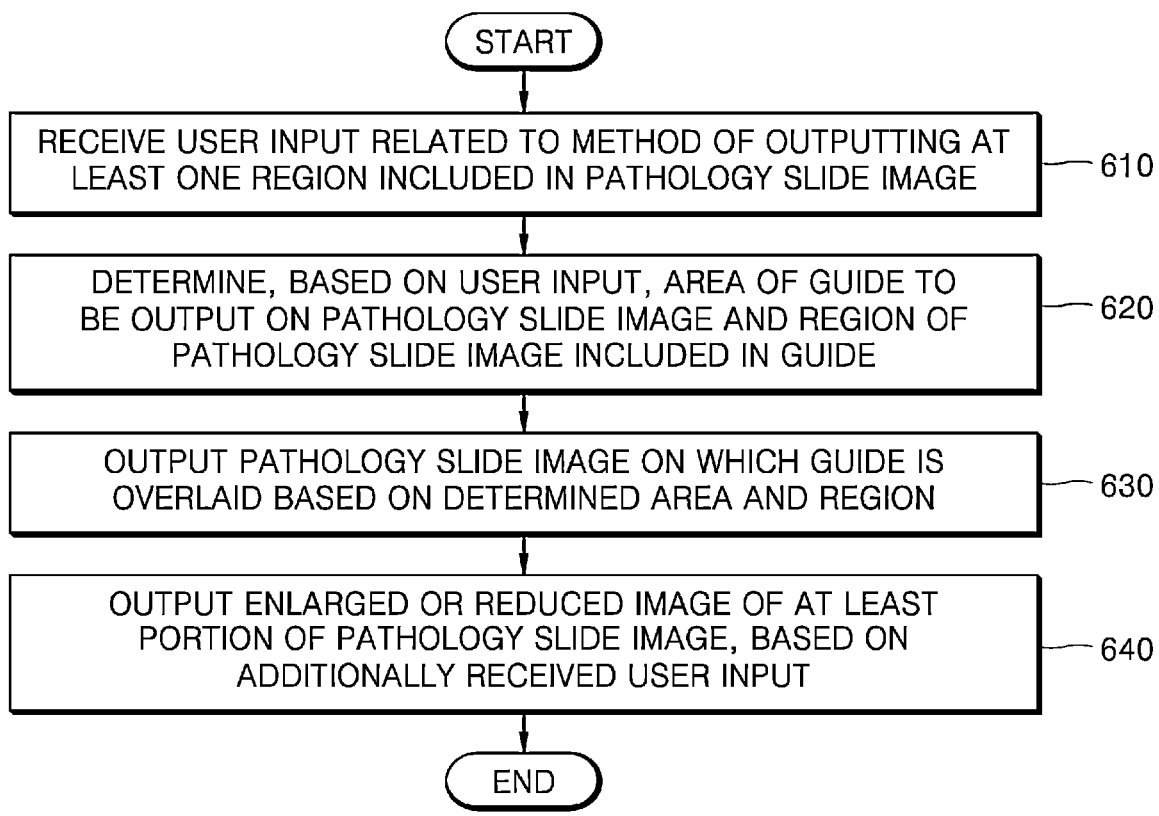
FIG. 6 is a flowchart illustrating another example of a method of outputting a pathology slide image according to an embodiment.

FIG. 6 is a flowchart illustrating another example of a method of outputting a pathology slide image according to an embodiment.

Referring to FIG. 6, operations 610 to 630 are the same as operations 310 to 330 of FIG. 3. Therefore, detailed descriptions of operations 610 to 630 will be omitted below.

In operation 640, the user terminal 10 or 100 outputs an enlarged or reduced image of at least a portion of the pathology slide image 40, based on an additionally received user input. For example, the processor 110 may control the display device to output the enlarged or reduced image of the at least a portion of the pathology slide image 40.

Here, the additional user input may be an input for enlarging or reducing the pathology slide image 40 without adjusting the magnification. For example, the pathology slide image 40 may be enlarged or reduced by various additional user inputs, for example, by the user 30 zooming in or out on the pathology slide image 40 by using a mouse wheel, or manipulating a UI (e.g., a button or a scroll bar) output on the display device. At this time, the guide overlaid on the pathology slide image 40 may be enlarged or reduced together with the pathology slide image 40, or may be fixed regardless of the pathology slide image 40 being enlarged or reduced. Hereinafter, an example in which the processor 110 outputs an image based on an additional user input will be described with reference to FIG. 7.

FIG. 7A and FIG. 7B are diagrams for describing another example in which a pathology slide image on which a guide is overlaid is output, according to an embodiment.

Referring to FIG. 7A, it is assumed that the pathology slide image on which a guide 710 corresponding to 40× magnification is displayed is output on the display device. Thereafter, according to a received user input, the processor 110 may enlarge or reduce the pathology slide image.

For example, referring to FIG. 7B, a guide 720 illustrated in FIG. 7B has the same magnification (i.e., 40× magnification) as that of the guide 710 illustrated in FIG. 7A. That is, according to a user input for enlarging the pathology slide image, the pathology slide image in which a partial region is enlarged as illustrated in FIG. 7B is output, and the size of the guide 720 may also be increased at the same time.

Meanwhile, an example in which a user input for enlarging a pathology slide image is received is described above with reference to FIG. 7A and FIG. 7B. The same method may also be applied to a case in which a user input for reducing a pathology slide image is received.

Figure 8:
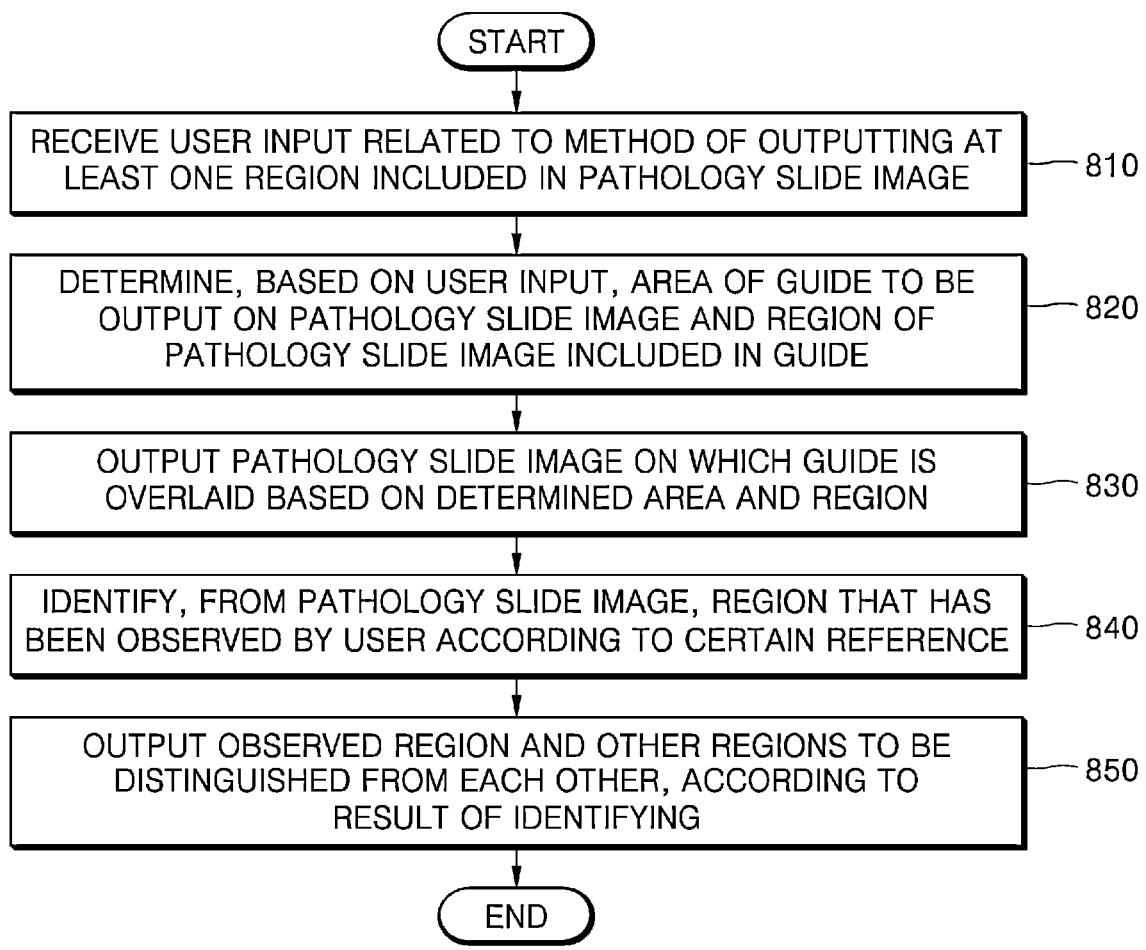
FIG. 8 is a flowchart illustrating another example of a method of outputting a pathology slide image according to an embodiment.

FIG. 8 is a flowchart illustrating another example of a method of outputting a pathology slide image according to an embodiment.

Referring to FIG. 8, operations 810 to 830 are the same as operations 310 to 330 of FIG. 3. Therefore, detailed descriptions of operations 810 to 830 will be omitted below.

In operation 840, the processor 110 identifies, from the pathology slide image 40, a region that has been observed by the user according to a certain reference.

Here, the certain reference includes that a magnification specified according to a user input is greater than or equal to a threshold magnification. That is, the processor 110 may determine which region in the pathology slide image 40 is observed by the user at a magnification greater than or equal to the threshold magnification.

For example, the threshold magnification may be a magnification of a level at which the user 30 may recognize the morphology of a cell based on an image. The threshold magnification may be preset or may be adjusted by the user 30.

In operation 850, the user terminal 10 or 100 output the observed region and the other regions to be distinguished from each other, according to a result of the identifying. For example, the processor 110 may control the display device to output the observed region to be distinguished from the other regions.

For example, a thumbnail image may be overlaid on a portion of the pathology slide image 40 and output, and the thumbnail image may be an image expressed such that the observed region according to a certain reference and the other regions are distinguished from each other.

Hereinafter, an example in which an observed region according to a certain reference and the other regions are output to be distinguished from each other will be described with reference to FIGS. 9 and 10.

Figure 9A:
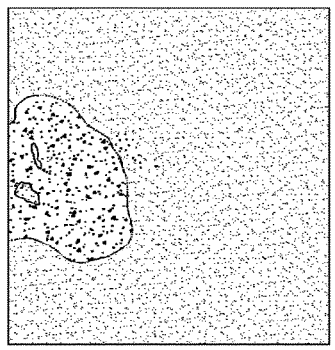
FIG. 9A to FIG. 9C are diagrams for describing an example in which an observed region according to a certain reference and the other regions are distinguished from each other, according to an embodiment.
Figure 9B:
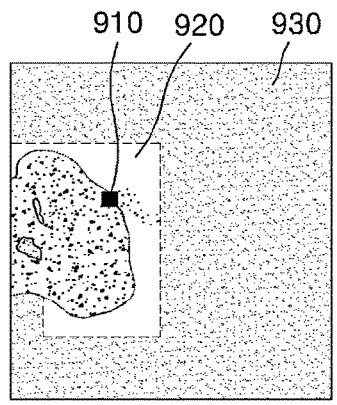
Figure 9C:
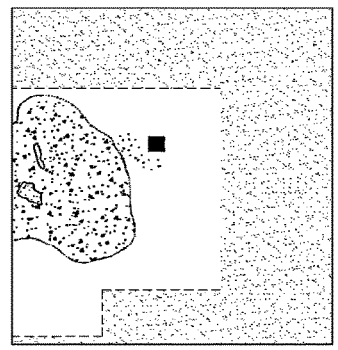

FIG. 9A to FIG. 9C are diagrams for describing an example in which an observed region according to a certain reference and the other regions are distinguished from each other, according to an embodiment.

FIG. 9A illustrates an original pathology slide image (i.e., an image without an observed region according to a certain reference).

As described above with reference to FIGS. 3 to 7, the user 30 may observe at least a portion of the original pathology slide image while enlarging or reducing it. In particular, the user 30 may observe the image while enlarging or reducing the image according to a desired magnification.

The processor 110 may check whether the magnification of a region observed by the user 30 is greater than or equal to a threshold magnification. For example, when information about a magnification specified by the user 30 is received as a user input, the processor 110 may determine whether the magnification according to the user input is greater than or equal to the threshold magnification by comparing the magnification with the threshold magnification. Then, the processor 110 may control the display device to output the region observed with a magnification greater than or equal to the magnification threshold, to be distinguished from the other regions.

Referring to FIG. 9B, a region 910 currently being observed by the user 30 is displayed. The processor 110 determines whether a magnification corresponding to the region 910 is greater than or equal to the threshold magnification. In this way, the processor 110 may identify a region 920, which is observed at a magnification greater than or equal to the threshold magnification, and other regions 930, and control the display device to output an image in which the region 920 and the regions 930 are distinguished from each other.

Referring to FIG. 9B and FIG. 9C, the region 920 may be displayed to be brighter than the other regions 930, and thus distinguished from the other regions 930. However, the method of distinguishing the region 920 from the other regions 930 is not limited to the above-described method.

Figure 10:
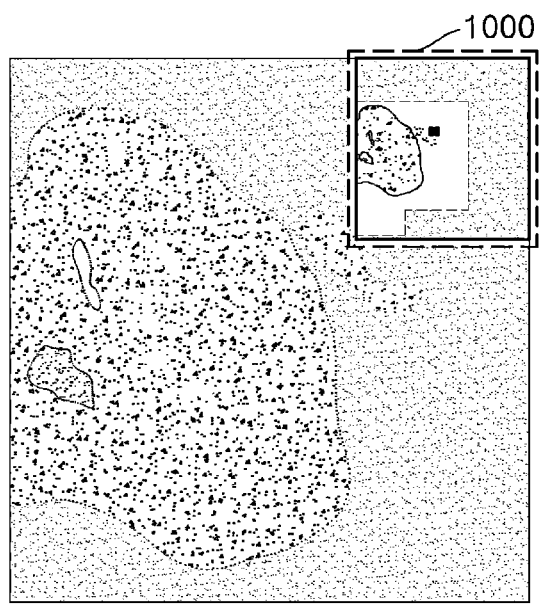
FIG. 10 is a diagram for describing an example in which a thumbnail image is output, according to an embodiment.

FIG. 10 is a diagram for describing an example in which a thumbnail image is output, according to an embodiment.

FIG. 10 illustrates an example in which a thumbnail image 1000 is output to overlap a portion of a pathology slide image. Here, the thumbnail image 1000 may be the image described above with reference to FIG. 9. However, the region in which the thumbnail image 1000 is output and the size thereof are not limited to the example illustrated in FIG. 10.

Figure 11:
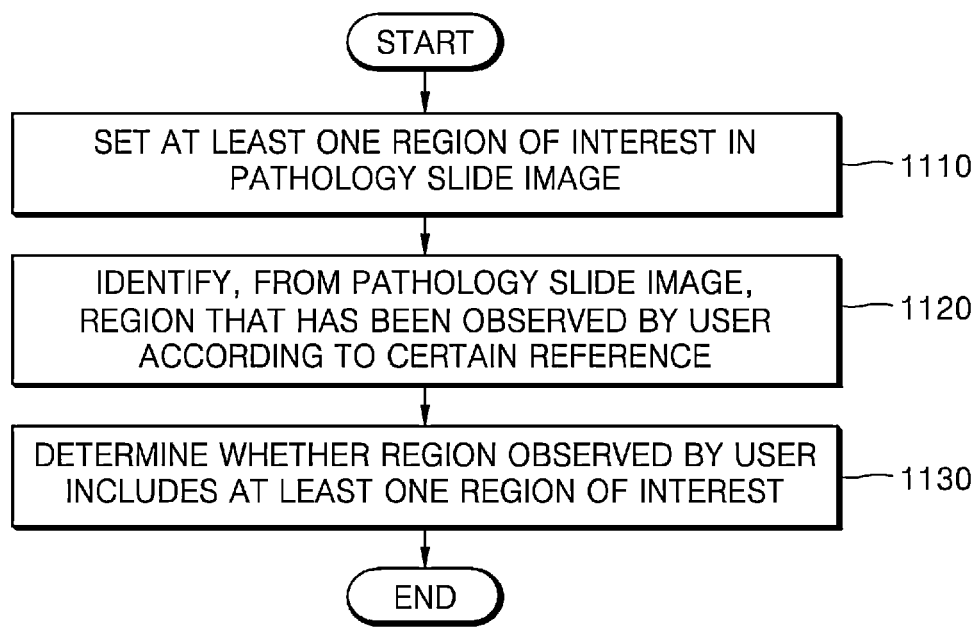
FIG. 11 is a flowchart illustrating another example of a method of outputting a pathology slide image according to an embodiment.

FIG. 11 is a flowchart illustrating another example of a method of outputting a pathology slide image according to an embodiment.

Although not illustrated in FIG. 11, an example to be described below with reference to FIG. 11 may be combined with at least some of the examples described above with reference to FIGS. 3 to 10 in parallel or in a time-series manner. Therefore, detailed descriptions of the contents provided above with reference to FIGS. 3 to 10 will be omitted below.

In operation 1110, the processor 110 sets at least one region of interest in the pathology slide image.

Here, the region of interest refers to a region in the pathology slide image 40 that needs to be observed by the user 30. For example, the region of interest may be, but is not limited to, an important region that needs to be observed for pathological examination on a disease. For example, in a case in which a diagnosis of lung cancer is required, a region of the pathology slide image 40 in which a lung cancer cell is present may be a region of interest, and in a case of examining mitosis of breast cancer, a region of the pathology slide image 40 in which mitosis is expected to be high may be a region of interest.

The processor 110 analyzes the pathology slide image 40 to set at least one region of interest. For example, the processor 110 may detect a region of interest by analyzing the pathology slide image 40 by using a predetermined image processing technique. As another example, the processor 110 may detect a region of interest in the pathology slide image 40 by using a machine learning model. In this case, the machine learning model may be trained to detect a region of interest in reference pathology slide images by using training data including a plurality of reference pathology slide images and a plurality of pieces of reference label information.

For example, the processor 110 may analyze the entire pathology slide image 40 to set at least one region of interest. As another example, the processor 110 may analyze a portion of the pathology slide image 40 to set at least one region of interest. In detail, the user 30 may specify in advance a portion of the pathology slide image 40 in which regions of interest are to be set, and the processor 110 may analyze only the portion specified by the user 30 to select at least one region of interest.

In operation 1120, the processor 110 identifies, from the pathology slide image, a region that has been observed by the user according to a certain reference.

Here, the certain reference includes that a magnification specified according to a user input is greater than or equal to a threshold magnification. That is, the processor 110 may determine which region in the pathology slide image 40 is observed by the user at a magnification greater than or equal to the threshold magnification.

For example, the threshold magnification may be a magnification of a level at which the user 30 may recognize the morphology of a cell based on an image. The threshold magnification may be preset or may be adjusted by the user 30.

In operation 1130, the processor 110 determines whether the region observed by the user includes at least one region of interest.

In other words, the processor 110 may determine whether a region of interest is included in the region observed by the user. In operation 1110, the processor 110 may identify in advance the region of interest in the pathology slide image 40. Accordingly, the processor 110 may determine whether the region of interest is included in the region observed by the user 30 in the pathology slide image 40.

Hereinafter, an example in which the processor 110 determines whether a region of interest is included in a region observed by the user will be described with reference to FIG. 12.

Figure 12:
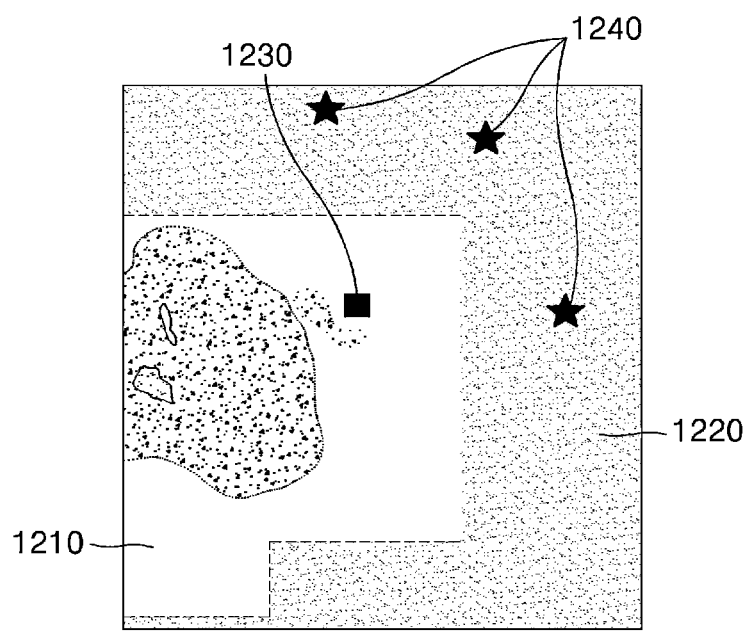
FIG. 12 is a diagram for describing an example in which a processor according to an embodiment operates.

FIG. 12 is a diagram for describing an example in which a processor according to an embodiment operates.

Referring to FIG. 12, the processor 110 may distinguish, in a pathology slide image, a region 1210 that has been observed by the user 30 from other regions 1220. Here, the region 1210 may be a region that has been observed to meet a certain reference as described above with reference to operation 1120. Also, a method, performed by the processor 110, of distinguishing the region 1210 from the other regions 1220 is the same as described above with reference to FIG. 8. That is, the region 1210 and the other regions 1220 may be determined based on a region 1230 currently being observed by the user 30.

The processor 110 determines whether regions of interest 1240 are included in the region 1210. For example, the fact that the regions of interest 1240 may be detected in advance according to a certain reference is as described above with reference to operation 1110. The processor 110 may distinguish, based on the region 1230, the region 1210 from the other regions 1220, and determine whether the regions of interest 1240 are included in the region 1210.

In addition, the processor 110 may provide a notification to the user 30 according to whether the regions of interest 1240 are included in the region 1210, which will be described below with reference to FIGS. 13 and 14.

Figure 13:
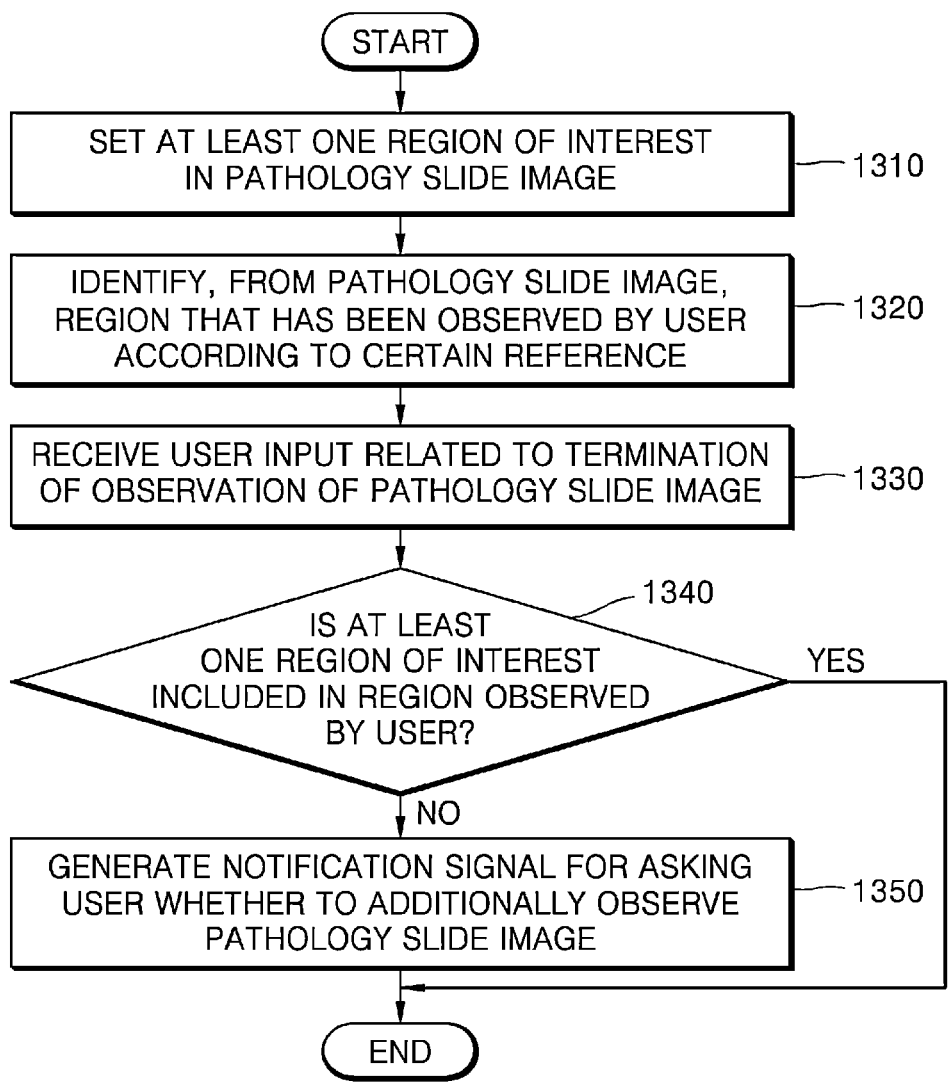
FIG. 13 is a flowchart illustrating another example of a method of outputting a pathology slide image according to an embodiment.

FIG. 13 is a flowchart illustrating another example of a method of outputting a pathology slide image according to an embodiment.

Referring to FIG. 13, operations 1310 and 1320 are the same as operations 1110 and 1120 of FIG. 11. Therefore, detailed descriptions of operations 1310 and 1320 will be omitted below.

In operation 1330, the user terminal 10 or 100 receives a user input related to termination of observation of the pathology slide image.

The user input includes various attempts by the user 30 to terminate the observation of the pathology slide image 40 currently output on the display device. For example, the user input may include an attempt by the user 30 to replace the currently output pathology slide image 40 with another image or to terminate a program for output and observation of the pathology slide image 40. Alternatively, the user input in operation 1330 may include a case in which no user input is received for a preset time period. For example, a case in which no user input is received for the preset time period after the pathology slide image 40 is output may correspond to reception of the user input in operation 1330.

In operation 1340, the processor 110 determines whether at least one region of interest is included in the region observed by the user.

Here, the region observed by the user includes a region of the pathology slide image 40 observed by the user according to a certain reference, and the certain reference includes that a magnification specified according to a user input is greater than or equal to a threshold magnification. An example in which the processor 110 determines whether a region of interest is included in a region observed by the user is as described above with reference to operations 1120 and 1130. In a case in which a plurality of regions of interest are present, the processor 110 may determine whether all of the plurality of regions of interest are included in the region observed by the user.

Meanwhile, an example in which the processor 110 determines whether a region of interest is included in a region observed by the user is not limited to the above-described example. For example, in a case in which the ratio of the region observed by the user to the entire region of interest is less than a preset ratio, the processor 110 may determine that the region of interest is not included in the region observed by the user. In a case of examining mitosis of breast cancer, a region expected to have high mitosis in the pathology slide image 40 may be set as a region of interest. Here, in a case in which the region observed by the user does not include a preset proportion (e.g., 50%) or more of the region of interest, the processor 110 may determine that the region observed by the user does not include the region of interest.

In a case in which the region of interest is not included in the region observed by the user, operation 1350 is performed, and otherwise, the process is terminated.

In operation 1350, the processor 110 generates a notification signal for asking the user whether to additionally observe the pathology slide image 40.

As described above with reference to operations 1330 and 1340, the observation of the currently output pathology slide image 40 may be terminated in a state in which the region of interest has not been observed. In this case, the processor 110 may generate and output a notification signal to help the user 30 determine whether to proceed with additional observation of the pathology slide image 40.

Meanwhile, regardless of whether the entire region of interest has been observed, the processor 110 may determine whether to generate the notification signal according to whether a predefined condition is satisfied. For example, in a case in which at least a portion of the region of interest of the pathology slide image 40 is included in the region previously observed by the user 30, and even the region of interest is present in a region not observed by the user 30, the processor 110 may not generate the notification signal. As another example, regardless of whether the region previously observed by the user 30 includes the region of interest, in a case in which the region of interest is present in the region not observed by the user 30, the processor 110 may generates the notification signal.

For example, the notification signal may be an image output on the display device, a sound output through a speaker, or a vibration output through a vibration motor. However, examples of the notification signal are not limited to those described above.

Figure 14:
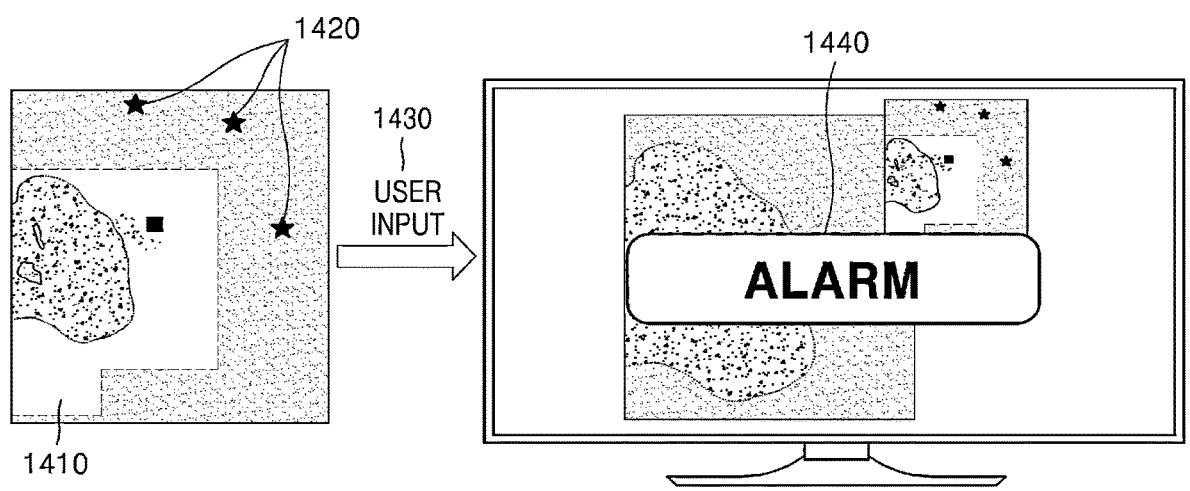
FIG. 14 is a diagram for describing an example in which a notification signal is generated, according to an embodiment.

FIG. 14 is a diagram for describing an example in which a notification signal is generated, according to an embodiment.

FIG. 14 illustrates a case in which regions of interest 1420 are not included in a region 1410 that has been observed by the user. In this situation, when a user input 1430 related to termination of observation of a pathology slide image is received, the processor 110 generates and outputs a notification signal 1440.

Meanwhile, an example in which the notification signal 1440 is output is not limited to that illustrated in FIG. 14. In detail, in a case in which the notification signal 1440 is to notify the user that at least a portion of the regions of interest 1420 has not been observed, the notification signal 1440 may be of any type, such as an image, a sound, or a vibration. Also, in a case in which the notification signal 1440 is an image, the image may include any message.

When an attempt by the user 30 to additionally observe the pathology slide image is received after the notification signal 1440 is output, the processor 110 may output the regions of interest 1420 on the display device to help the user 30 observe the pathology slide image.

As described above, even the user 30, who is accustomed to examining an image with a conventional optical microscope, may easily perform image examination according to the digital pathology. In addition, the user 30 may intuitively check whether there is an unobserved region in the pathology slide image 40. Also, the user 30 may intuitively check whether the region of interest included in the pathology slide image 40 has been completely observed.

Meanwhile, the above-described method may be written as a computer-executable program, and may be implemented in a general-purpose digital computer that executes the program by using a computer-readable recording medium. In addition, the structure of the data used in the above-described method may be recorded in a computer-readable recording medium through various means. The computer-readable recording medium may include a magnetic storage medium (e.g., ROM, RAM, a universal serial bus (USB) storage device, a floppy disk, or a hard disk), and an optical recording medium (e.g., a CD-ROM or a DVD), but is not limited thereto.

It will be understood by those of skill in the art that the present disclosure may be implemented in a modified form without departing from the intrinsic characteristics of the descriptions provided above. Therefore, the methods disclosed herein are to be considered in a descriptive sense only, and not for purposes of limitation, and the scope of the present disclosure is defined not by the above descriptions, but by the claims and their equivalents, and all variations within the scope of the claims and their equivalents are to be construed as being included in the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method comprising:
receiving, by a processor, a first user input related to a method of outputting at least one region included in a pathology slide image, wherein the first user input related to the method of outputting includes a user input specifying a magnification;
based on the first user input, determining, by the processor, an area of a guide to be output on the pathology slide image and a region of the pathology slide image included in the guide;
based on the area of the guide and the determined region, outputting, by the processor, the pathology slide image on which the guide is overlaid;
determining, by the processor from the pathology slide image, a current region currently being observed by a user as an observed region or non-observed region based on a threshold magnification and the user input specifying the magnification, wherein the observed region comprises at least one previous region which has already been observed by the user in the pathology slide image,
updating, by the processor, the observed region by adding, to the at least one previous region, the current region in case that the current region is observed by the user at the magnification being greater than or equal to the threshold magnification; and
outputting, by the processor based on the updating, the updated observed region to be distinguished from the non-observed region of the pathology slide image.

2. The method of claim 1, wherein the determining of the area of the guide comprises, based on the magnification specified according to the first user input, increasing or decreasing the area of the guide in a state in which the determined region is fixed.

3. The method of claim 1, wherein the determining of the area of the guide comprises, based on the magnification specified according to the first user input, enlarging or reducing the determined region in a state in which the area of the guide is fixed.

4. The method of claim 1, further comprising, based on an additionally received user input, outputting an enlarged or reduced image of at least a portion of the pathology slide image.

5. The method of claim 1, wherein the outputting of the updated observed region comprises outputting a thumbnail image expressed such that the observed region is distinguished from the non-observed region.

6. The method of claim 1, further comprising:
setting at least one region of interest in the pathology slide image; and
determining whether the updated observed region includes the at least one region of interest.

7. The method of claim 6, further comprising:
receiving a second user input related to termination of observation of the pathology slide image; and
based on a result of the determining, generating a notification signal for asking whether to additionally observe the pathology slide image.

8. A non-transitory computer-readable recording medium having recorded thereon a program for causing a computer to execute the method of claim 1.

9. The method of claim 1, wherein the outputting of the updated observed region comprises:
outputting a pathological image display region of the updated observed region with a visual representation, wherein the updated observed region is output on the pathology slide image while being visually distinguished from the non-observed region by the visual representation.

10. A computing device comprising:
at least one memory; and
at least one processor,
wherein the at least one processor is configured to:
determine, based on a first user input related to a method of outputting at least one region included in a pathology slide image, an area of a guide to be output on the pathology slide image and a region of the pathology slide image included in the guide, wherein the first user input related to the method of outputting includes a user input specifying a magnification;
control a display device to output the pathology slide image on which the guide is overlaid, based on the area of the guide and the determined region;
determine, from the pathology slide image, a current region currently being observed by a user as an observed region or non-observed region based on a threshold magnification and the user input specifying the magnification, wherein the observed region comprises at least one previous region which has already been observed by the user in the pathology slide image,
update the observed region by adding, to the at least one previous region, the current region in case that the current region is observed by the user at the magnification being greater than or equal to the threshold magnification; and
control the display device to output, based on the updating, the updated observed region to be distinguished from the non-observed region of the pathology slide image.

11. The computing device of claim 10, wherein the at least one processor is further configured to, based on the magnification specified according to the first user input, increase or decrease the area of the guide in a state in which the determined region is fixed.

12. The computing device of claim 10, wherein the at least one processor is further configured to, based on the magnification specified according to the first user input, enlarge or reduce the determined region in a state in which the area of the guide is fixed.

13. The computing device of claim 10, wherein the at least one processor is further configured to, control the display device to output an enlarged or reduced image of at least a portion of the pathology slide image, based on an additionally received user input.

14. The computing device of claim 10, wherein the at least one processor is further configured to control the display device to output a thumbnail image expressed such that the updated observed region is distinguished from the non-observed region.

15. The computing device of claim 10, wherein the at least one processor is further configured to set at least one region of interest in the pathology slide image, and determine whether the updated observed region includes the at least one region of interest.

16. The computing device of claim 15, wherein the at least one processor is further configured to, upon reception of a second user input related to termination of observation of the pathology slide image, generate, based on a result of the determining, a notification signal for asking whether to additionally observe the pathology slide image.

17. The computing device of claim 10, wherein the at least one processor is further configured to:
   control the display device to output a pathological image display region of the updated observed region with a visual representation, and
   wherein the updated observed region is output on the pathology slide image while being visually distinguished from the non-observed region by the visual representation.

* * * * *